Figure 1:
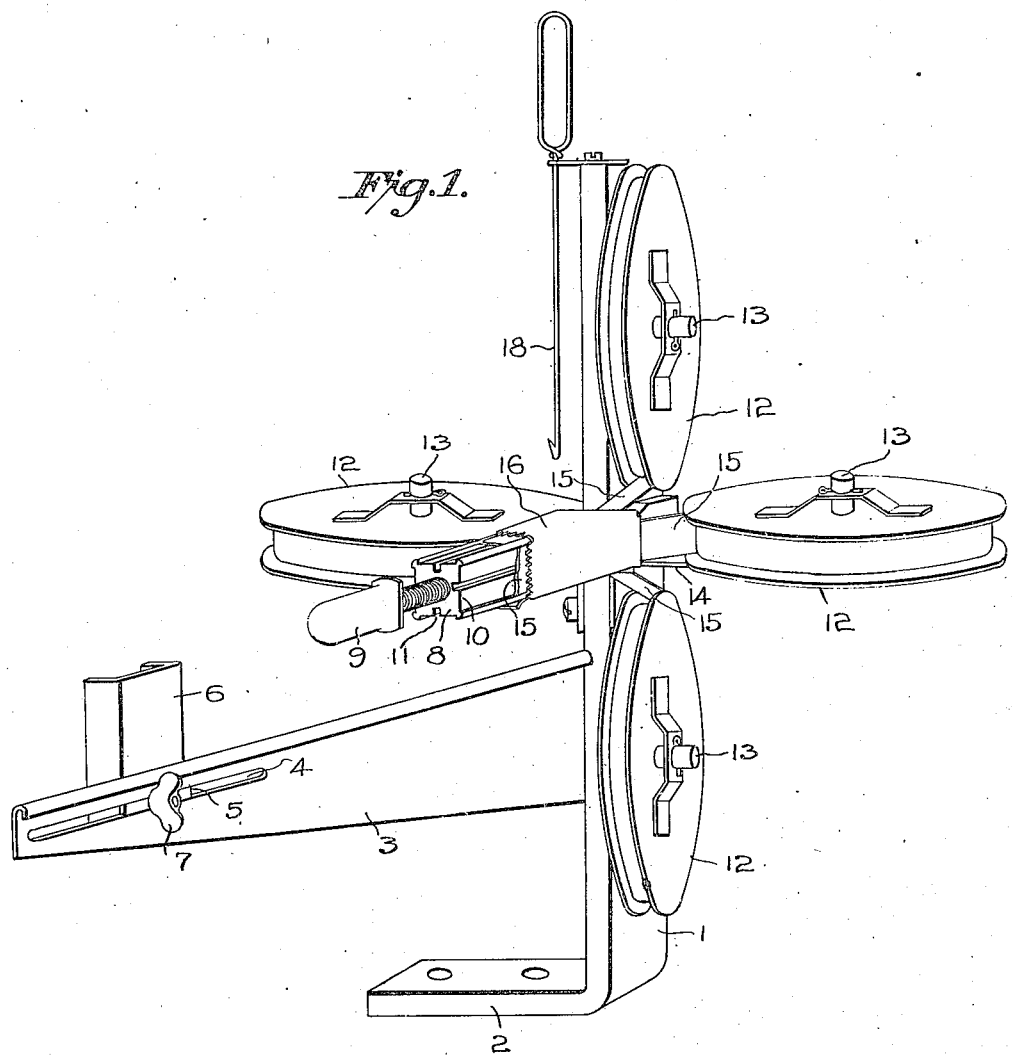

March 27, 1928.  1,664,212
E. E. HAWKINSON
METHOD OF AND MACHINE FOR MAKING MAGNET COIL CORES
Filed Jan. 2, 1926  2 Sheets-Sheet 1

WITNESSES:
R. S. Harrison
Wm B Jaspert

INVENTOR
Emil E. Hawkinson
BY
Wesley G. Carr
ATTORNEY

March 27, 1928.                                                              1,664,212
E. E. HAWKINSON
METHOD OF AND MACHINE FOR MAKING MAGNET COIL CORES
Filed Jan. 2, 1926                    2 Sheets-Sheet 2
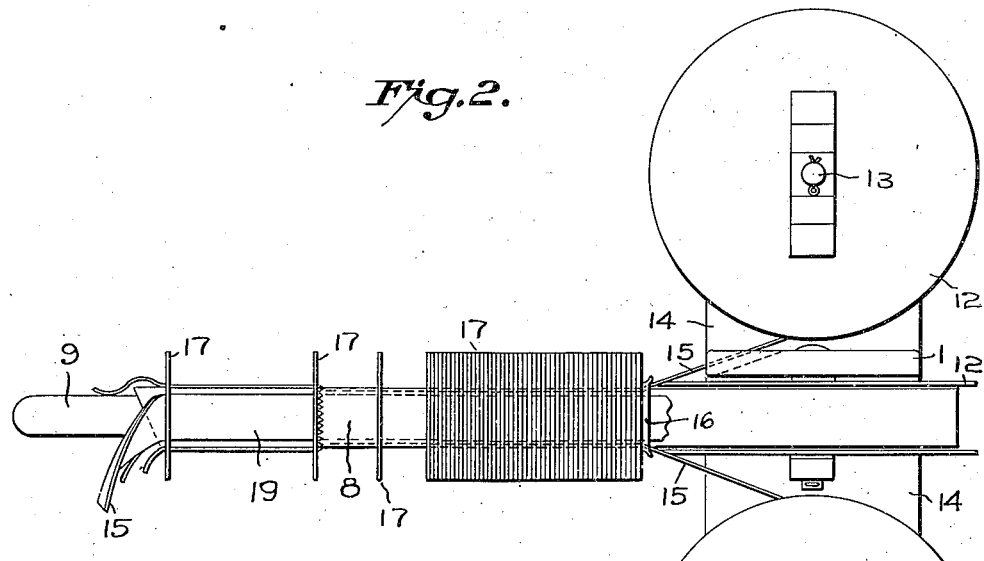
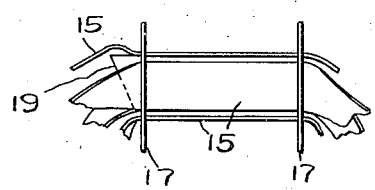
WITNESSES:
R. S. Harrison
Wm B. Jaspert
INVENTOR
Emil E. Hawkinson
BY
Wesley G. Carr
ATTORNEY Patented Mar. 27, 1928.

1,664,212

UNITED STATES PATENT OFFICE.

EMIL E. HAWKINSON, OF SOUTH BEND, INDIANA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

METHOD OF AND MACHINE FOR MAKING MAGNET-COIL CORES.

Application filed January 2, 1926. Serial No. 78,829.

My invention relates to tube, tape and end washer assembly machines, more particularly to an assembly device for making the cores of magnet coils, spools and the like.

It is among the objects of my invention to provide a device for assembling the tubes and end washers for magnet coils and simultaneously inserting strips of tape therein in a simple and expedient manner and one which shall greatly increase and facilitate the manufacture of such members in production quantities.

Another object of my invention is to provide a device for assembling the centers of magnet coils to produce uniform structures, which shall comprise a simple and inexpensive structure that shall be mechanically durable and efficient in its assembling operation.

Another object of my invention is to provide an assembling device of the above designated character which shall eliminate the waste of material and time that is involved in the manufacture of similar articles by manual operations and which shall eliminate the need of binding agents that were heretofore necessary for holding the tape utilized during the assembly of the end washers.

The cores for magnet coils usually comprise a rectangular tube of fibrous insulating material or molded tubes of fibrous sheet material consolidated with a binder. In the assembly of the cores as heretofore practiced, a number of such tubes were laid out on the work bench or table and the outer surfaces of the tubes were brushed with glue. A plurality of strips of tape were then laid on the glued surfaces and the ends of the strips were inserted in the ends of the tube. Where rectangular tubing was employed, the strips were applied to all four sides and washers of fuller board or other fibrous material were then placed over the ends of the strips of tape and the tube. The ends of the tapes were brought out from inside the tube. The tapes were then stretched evenly and the spool was ready for use. This method of assembling by hand was tedious, and the use of glue was undesirable, since materials and tools were constantly soiled thereby.

In accordance with my present invention, I utilize an assembly device, which comprises a mandrel or holder that supports the tube member on a vertical frame, and a plurality of supply reels for holding the tape so disposed as to bring the flat surfaces of the tape in alignment with the faces of the tube member. By the use of this device, the glueing of the tape is unnecessary since facilitates are provided for retaining the strips in their proper position until the end washers are assembled thereon.

In the accompanying drawings, constituting a part hereof and in which like reference characters designate like parts:

Figure 1 is a view in perspective of an assembling device for magnet coil cores and the like embodying the principles of my invention, Fig. 2 is a top plan view thereof and Fig. 3 is a view in side elevation of the finished magnet core after its removal from the assembly device.

Referring to Fig. 1, the device therein illustrated comprises a vertical standard or upright 1 having one of its ends bent at right angles to form a base 2 by which it is secured to a work bench or the like. A horizontally extending guide arm or cross-arm 3 is secured to the member 1, and a slot 4 is provided in the arm 3 to receive the tongue 5 of a stop 6, which is movably secured to the arm 3 in any longitudinal position of the slot by means of a wing nut 7 that is in screw-thread engagement with a bolt extending through the tongue 5 of the stop member.

A horizontally-extending mandrel or work holder 8 is detachably secured to the upright member 1 above the arm 3 by a screw member 9. The mandrel is of substantially rectangular shape and is provided with depressed faces 10 and grooves 11 for purposes to be hereinafter set forth. A plurality of supply reels 12 are rotatably mounted on stud arbors 13 that are fastened in a pair of cross arms 14, which are secured to member 1 so that the strip material, such as tape 15, carried thereby may be converged in a rectangular mouth of a tubular guiding member 16 that serves as a mounting for a supply of end washers 17 (Fig. 2) and encloses the mandrel 8. The mandrel and washers are then inserted in the tubular member 16.

Referring to Fig. 2, the assembly device is utilized as follows: A length of rectangular tubing 19 is disposed on the rectangular mandrel 8, and a plurality of end washers 17 having openings corresponding to the shape of the tube 19 are disposed around the mandrel 8 and placed to one side over member 16 as shown (Fig. 2). Each tape 15 is unreeled and drawn through the tube 16 with a considerable portion hanging as shown. The tapes are drawn through the four respective depressed surfaces 10 of the mandrel 8 by means of a hook 18 (Fig. 1) which is inserted in the slots 11 for the purpose of drawing the strips through the tubing. Two end washer 17 are then slipped over the tape to within one-half inch of the ends of the tube 19. The locking screw member 9 is then released and the tube assembly pulled off the mandrel to adjustable stop 6. The tape is then cut off at the end of holding member 9, thus providing the desired length by gauge. The core, as produced by this device, is as shown in Fig. 3, which is the condition in which it is utilized for the subsequent winding of the magnet wire.

The core is subsequently mounted in a winding machine and wire is wound between the end washers 17. The extending ends of the tape 15 are turned over the end washers and wound underneath the last layer of wire.

It is evident from the foregoing description of my invention that an assembly device of the character herein described greatly facilitates the manufacture of magnet cores. I have found that by the use of this device an increase of over 100% is obtained in the production of a single operator over the hand method of assembly heretofore utilized.

Although I have described a specific embodiment of my invention, it will be obvious to those skilled in the art that various modifications may be made in the details of construction without departing from the principles herein set forth.

I claim as my invention:

1. An assembly device comprising a standard, a plurality of supply reels mounted for rotation with respect to said standard, a mandrel detachably secured to said standard in cooperative alinement with said reels, and a stop mechanism associated with said mandrel for limiting the movement of said mandrel when disengaged from said standard.

2. An assembly device comprising a standard, a cross-arm secured thereto, a plurality of supply reels mounted for rotation with respect to said standard and cross-arm, a substantially rectangular mandrel detachably secured to said standard and having its sides in working alinement with the faces of the respective reels, and a stop mechanism associated with said cross-arm for limiting the movement of said mandrel when disengaged from said standard.

3. An assembly device comprising a standard, a plurality of tape supply reels mounted on said standard, a substantially rectangular mandrel mounted on said standard, and a stop mechanism associated with said mandrel for limiting the movement of said mandrel when disengaged from said standard, said mandrel and reels being arranged to permit the tape material to be unreeled flatly against the faces of said mandrel.

4. A method of assembling cores and the like for magnet coils which comprises disposing a fibrous tube on a rectangular mandrel, simultaneously drawing insulating material through said tube on the respective sides of said mandrel, slipping end washers over said tube, arranging said washers in spaced relation thereon, and cutting off the tape to a predetermined length.

5. An assembly device comprising a support, a mandrel provided with grooves mounted on said support, supply reels associated with said mandrel and guiding means for guiding tape from said supply reels through said grooves simultaneously.

6. A device for assembling magnet-coil cores consisting of a tube, a plurality of end washers and sections of tape, said device comprising a standard having means for mounting a plurality of tape-supply reels thereon, a mandrel secured to said standard in cooperative alignment with said reels and means disposed on said mandrel for guiding the tape and supporting the end washers.

7. A device for assembling magnet-coil cores consisting of a tube, a plurality of end washers and sections of tape, said device comprising a standard having a plurality of tape-supply reels rotatably mounted on said standard, a mandrel secured to said standard in cooperative alignment with said reels and means disposed on said mandrel for frictionally engaging and guiding the tape when it is drawn upon said mandrel through said guiding means.

8. A device for assembling magnet-coil cores consisting of a tube, a plurality of end washers and sections of tape, said device comprising a standard having means for mounting a plurality of tape-supply reels thereon, a mandrel secured to said standard in cooperative alignment with said reels and means disposed on said mandrel for guiding a plurality of tapes upon the faces of said mandrel and for providing a support for the end washers.

9. A device for assembling magnet-coil cores consisting of a tube, a plurality of end washers and section of tape, said device comprising a standard having means for mounting a plurality of tape-supply reels thereon, a mandrel secured to said standard in cooperative alignment with said reels, said mandrel being provided with a plurality of recessed faces for engaging tape from said reels and guiding and supporting means disposed on said mandrel for holding said washers and guiding said tape.

10. A device for assembling magnet-coil cores consisting of a tube, a plurality of end washers and sections of tape, said device comprising a standard having means for mounting a plurality of tape-supply reels thereon, a mandrel detachably secured to said standard in cooperative alignment with said reels, means disposed on said mandrel for guiding the tape and means associated with said standard for measuring the amount of tape required for each core.

11. A device for assembling magnet-coil cores consisting of a tube, a plurality of end washers and sections of tape, said device comprising a standard, a plurality of tape-supply reels rotatably mounted on said standard, a mandrel detachably secured to said standard in cooperative alignment with said reels, guiding means disposed on said mandrel and means on said assembly device for measuring the amount of tape required for each core, said measuring means comprising an arm on said standard, and a stop on said arm adapted to limit the movement of said mandrel when it is disengaged from said standard.

In testimony whereof, I have hereunto subscribed my name this seventeenth day of December, 1925.

EMIL E. HAWKINSON.